(12) United States Patent
Tsuchiya et al.

(10) Patent No.: US 11,579,780 B1
(45) Date of Patent: Feb. 14, 2023

(54) VOLUME REMOTE COPY BASED ON APPLICATION PRIORITY

(71) Applicant: Hitachi, Ltd., Tokyo (JP)

(72) Inventors: Akiyoshi Tsuchiya, San Jose, CA (US); Tomohiro Kawaguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/459,841

(22) Filed: Aug. 27, 2021

(51) Int. Cl.
*G06F 3/06* (2006.01)

(52) U.S. Cl.
CPC .......... *G06F 3/0619* (2013.01); *G06F 3/0604* (2013.01); *G06F 3/065* (2013.01); *G06F 3/067* (2013.01); *G06F 3/0631* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 7,275,142 B1 * | 9/2007 | Schultz | G06F 11/2094 711/162 |
| 7,457,925 B2 * | 11/2008 | Fujino | G06F 3/0605 711/170 |
| 8,880,774 B2 | 11/2014 | Schmidt et al. | |
| 9,632,701 B2 | 4/2017 | Watanabe et al. | |
| 2003/0200487 A1 * | 10/2003 | Taninaka | G06F 11/3051 714/E11.187 |
| 2004/0205312 A1 * | 10/2004 | Zlotnick | G06F 11/2069 711/162 |
| 2007/0283090 A1 * | 12/2007 | Kaji | G06F 11/2094 711/114 |
| 2016/0342349 A1 * | 11/2016 | Borlick | G06F 3/067 |
| 2018/0011728 A1 | 1/2018 | Nasu et al. | |
| 2019/0332275 A1 * | 10/2019 | Jin | G06F 11/2097 |

* cited by examiner

*Primary Examiner* — Brian R Peugh
(74) *Attorney, Agent, or Firm* — Procopio, Cory, Hargreaves & Savitch LLP

(57) ABSTRACT

Example implementations described herein involve systems and methods which automatically determine volumes to be replicated for disaster recovery based on the execution priority of an application which uses the volumes. Such example implementations can involve systems and methods involving creating a volume in a first storage system for each of one or more containers newly launched on one or more servers managing a container orchestrator; and establishing replication of the volume for the each of the newly launched one or more containers to a second storage system in order from highest container priority to lowest container priority.

13 Claims, 17 Drawing Sheets

| Name | Cluster1 | Cluster2 |
|---|---|---|
| Pair 1 | http://clusterA/ | http://clusterB/ |
| Pair 2 | http://clusterA/ | http://clusterC/ |

FIG. 4

| Name  | Storage ID | Pool ID | Address              |
|-------|------------|---------|----------------------|
| Pool1 | 1          | 1       | http://192.168.1.100 |
| Pool2 | 1          | 2       | http://192.168.1.100 |
| Pool3 | 2          | 1       | http://192.168.1.200 |

FIG. 5

| Name | Image URL | Volume Claim name | Priority |
|---|---|---|---|
| App1 | http://registry1/app1 | vc-1-1 | 100 |
| App2 | http://registry2/app2 | None | 50 |
| App3 | http://registry1/app3 | vc-1-1 | 25 |

FIG. 6

| Name | Size | Storage Class name |
|---|---|---|
| vc-1-1 | 10G | Pool1 |
| vc-1-2 | 10G | Pool1 |
| vc-2 | 50G | Pool2 |
| vc-3 | 20G | Pool1 |

FIG. 7

| Name | Volume Claim ref | Size | Storage Class Name | Volume ID |
|---|---|---|---|---|
| volume-1 | vc-1-1 | 10G | Pool1 | 1 |
| volume-2 | vc-1-2 | 10G | Pool1 | 2 |
| volume-3 | vc-2 | 50G | Pool2 | 3 |
| volume-4 | vc-3 | 20G | Pool1 | 4 |

FIG. 8

| Container Name | Container Priority | Volumes ||||||||
| | | In Own cluster ||| Replicated | In Paired cluster |||
| | | Volume Name | Claim Name | size | | Volume Name | Claim Name | size |
| App1 | 100 | volume-1 | vc-1-1 | 10G | Yes | volume-a | vc-1-1 | 10G |
| | | volume-2 | vc-1-2 | 10G | No | : | : | : |
| App2 | 75 | volume-4 | vc-2 | 30G | No | : | : | : |
| App3 | 50 | volume-3 | vc-3 | 50G | Yes | volume-c | vc-3 | 50G |

FIG. 9

| Volume Name | Claim Name | Size |
|---|---|---|
| volume-a | vc-1-1 | 10G |
| volume-a | vc-3 | 50G |

FIG. 10

| Volume Name in Own Cluster | Claim Name in Own Cluster | Volume Name in Paired Cluster | Claim Name in Paired Cluster |
|---|---|---|---|
| volume-1 | vc-1-1 | volume-a | vc-1-1 |
| volume-3 | vc-3 | volume-c | vc-3 |

FIG. 11

| Pool ID | Total Capacity | Used Capacity |
|---|---|---|
| 1 | 50TB | 25TB |
| 2 | 50TB | 45TB |

FIG. 12

| Source volume ID | Source storage ID | Destination volume ID | Destination storage ID | Status |
|---|---|---|---|---|
| 1 | 1 | 10 | 3 | copied |
| 1 | 1 | 15 | 2 | copying |
| 2 | 1 | 20 | 3 | suspend |

FIG. 13

VOLUME REMOTE COPY BASED ON APPLICATION PRIORITY

BACKGROUND

Field

The present disclosure is generally related to disaster recovery systems, and more specifically, to volume remote copy based on application priority.

Related Art

With the growth of digital service business, availability of application serving the digital services have a huge impact against business. Therefore, to establish resiliency against incidents, disaster recovery is required.

Related art implementations facilitate disaster recovery (DR) and high availability (HA) in which data is replicated across storages.

In another related art implementation, there is a virtual machine (VM) deployment mechanism with DR based on user request for data redundancy. In this mechanism, users request whether DR is necessary when users deploy a VM. Based on the request, system decides volume locations which meets the requirement and configures replication between the volumes. Finally, the system decides VM locations which can access volumes from.

SUMMARY

Users would like to configure DR for as many applications permitted within the available resources in the order of importance of applications so as to improve resiliency of applications while using Informational Technology (IT) resource efficiently.

In addition, lower operational cost is desired because new applications for the digital service are frequently deployed to deliver new value to customer, and their requirements can change frequently.

However, related art implementations require users to determine which volumes should be replicated based on the order of importance between applications and reconfigure volume replication based on the determination as to whenever new applications are deployed or as the importance of each application changes.

Aspects of the present disclosure involve a method, which can involve creating a volume in a first storage system for each of one or more containers newly launched on one or more servers managing a container orchestrator; and establishing replication of the volume for the each of the newly launched one or more containers to a second storage system in order from highest container priority to lowest container priority.

Aspects of the present disclosure involve a computer program, storing instructions for executing a process, the instructions involving creating a volume in a first storage system for each of one or more containers newly launched on one or more servers managing a container orchestrator; and establishing replication of the volume for the each of the newly launched one or more containers to a second storage system in order from highest container priority to lowest container priority. The instructions can be stored on a non-transitory computer readable medium.

Aspects of the present disclosure involve a system, involving means for creating a volume in a first storage system for each of one or more containers newly launched on one or more servers managing a container orchestrator; and means for establishing replication of the volume for the each of the newly launched one or more containers to a second storage system in order from highest container priority to lowest container priority.

Aspects of the present disclosure involve an apparatus, involving a processor configured to create a volume in a first storage system for each of one or more containers newly launched on one or more servers managing a container orchestrator; and establish replication of the volume for the each of the newly launched one or more containers to a second storage system in order from highest container priority to lowest container priority.

Aspects of the present disclosure involve a method, which can include establishing replication of the volume for the each of the one or more computing units on one or more servers managing a computing unit orchestrator to a second storage system in order from highest computing unit priority to lowest computing unit priority.

Aspects of the present disclosure involve a computer program, which can include establishing replication of the volume for the each of the one or more computing units on one or more servers managing a computing unit orchestrator to a second storage system in order from highest computing unit priority to lowest computing unit priority. The computer program may be stored on a non-transitory computer readable medium to be executed by one or more processors.

Aspects of the present disclosure involve a system, which can include means for establishing replication of the volume for the each of the one or more computing units on one or more servers managing a computing unit orchestrator to a second storage system in order from highest computing unit priority to lowest computing unit priority.

Aspects of the present disclosure involve an apparatus, which can involve a processor configured to establish replication of the volume for the each of the one or more computing units on one or more servers managing a computing unit orchestrator to a second storage system in order from highest computing unit priority to lowest computing unit priority.

BRIEF DESCRIPTION OF DRAWINGS

FIG. 4 illustrates an example of a cluster pair management table, in accordance with an example implementation.

FIG. 5 illustrates an example of a storage class table, in accordance with an example implementation.

FIG. 6 illustrates an example of a container table, in accordance with an example implementation.

FIG. 7 illustrates an example of a volume claim table, in accordance with an example implementation.

FIG. 8 illustrates an example of a volume table, in accordance with an example implementation.

FIG. 9 illustrates an example of the DR candidate container list, in accordance with an example implementation.

FIG. 10 illustrates an example of the new DR target volume list, in accordance with an example implementation.

FIG. 11 illustrates an example of a delete target volume list, in accordance with an example implementation.

FIG. 12 illustrates an example of storage pool management table, in accordance with an example implementation.

FIG. 13 illustrates an example of copy management table, in accordance with an example implementation.

DETAILED DESCRIPTION

Figure 1:
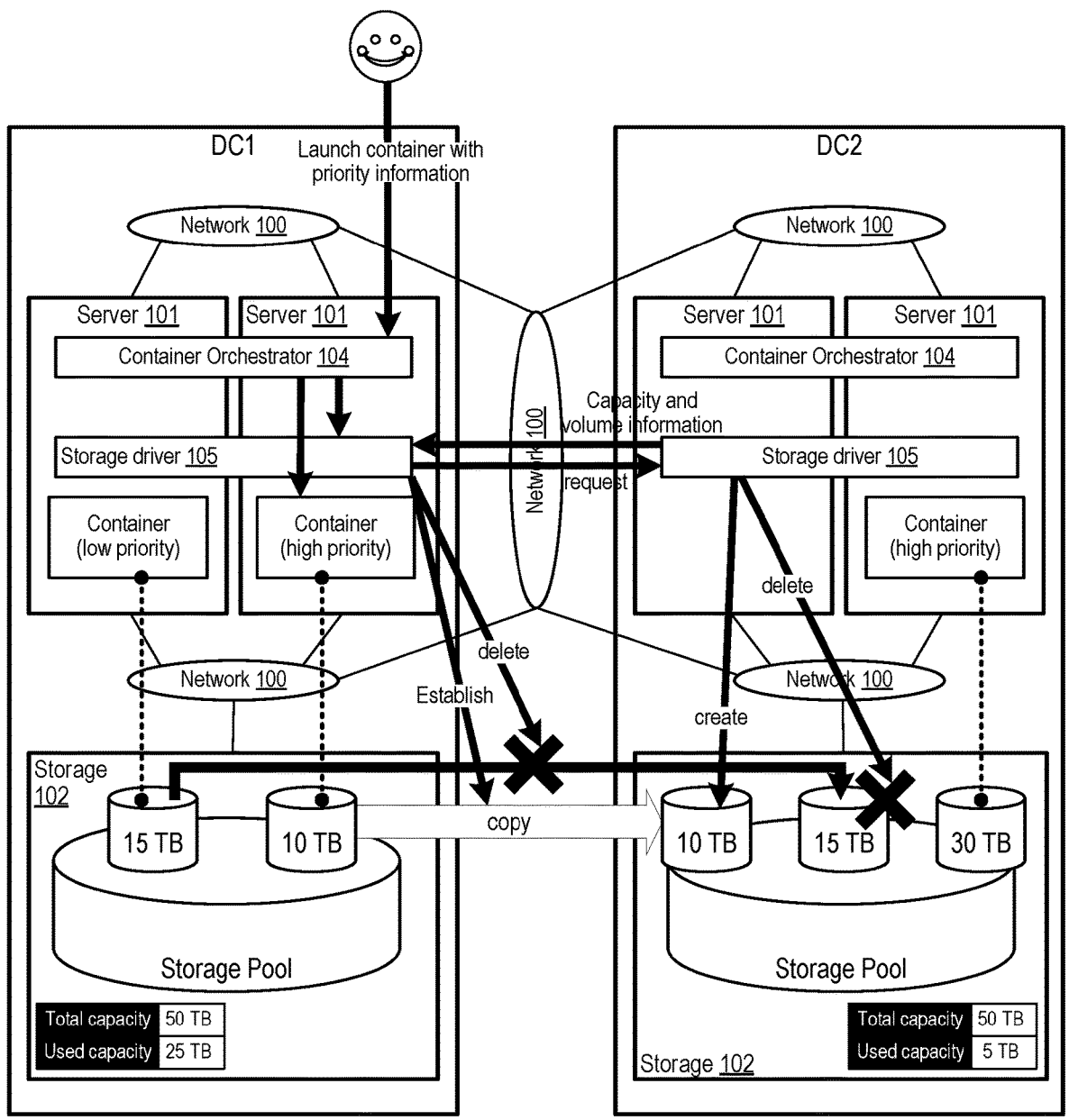
FIG. 1 illustrates an example of an overall system configuration and processing flow of the first embodiment.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations involve systems and mechanism which automatically determines volumes to be replicated for DR based on an execution priority of an application which uses the volumes. This mechanism automatically configures the replication of volumes for as many applications as the amount of resources allow in order of priority of applications. When a new application is deployed or the priority of an application has changed, this mechanism determines the volumes to be replicated or the volumes to be unreplicated based on the priority of the application which uses the volumes. Based on the determination, the mechanism configures and cancels replication.

It is common for users to specify the priority of each application in order to specify which applications have priority to execute when resources such as central processing units (CPUs) and memory are insufficient. Applications that should be prioritized even when resources are insufficient are important for business, and they should be prioritized for recovery even when a disaster occurs. Example implementations described herein utilize the priority of application to determine which volumes should be replicated.

The example implementations are described herein with respect to a platform which uses container technology, because the container technology is usually used as platform for a digital service which requires development and release agility. The container is one example of the computing unit which the present disclosure can be applied. However, the present disclosure is not limited thereto, and can be applicable to other forms of computing units, such as VMs, logical partitions (LPARs), jobs, processes and threads. In these cases, the example implementations can be applied by replacing the container with the respective deployment unit.

FIG. 1 illustrates an example of an overall system configuration and processing flow of the first embodiment. This system has multiple data centers. Data centers are connected via a network 100, which can be in the form of internet, a dedicated network such as a dark fibre network, and so on depending on the desired implementation. Each data center has multiple servers 101 and storage systems 102. Servers and storage systems are connected via a network 100.

In this system, applications are executed as containers. To orchestrate container execution, the container orchestrator 104 is running on servers 101. To manage storage used by the containers, a storage driver 105 is also running on the server 101. Instances of the container orchestrator 104 and the storage driver 105 can run on each server 101 and process their task in a distributed manner. Or, only one instance of them can run on one server and process their task depending on the desired implementation.

The example of FIG. 1 involves a disaggregated architecture in which storage systems 102 and servers 101 are disaggregated. However, the present disclosure is not limited to such an architecture, and other architectures can be used to facilitate the desired implementation. For example, by using hyperconverged technology, the functionality of storage can be run on the same server with the container.

When users request the container orchestrator 104 to prepare volumes for containers, the storage driver 105 create new volumes in a pool of storages or attach existing volumes to the container.

When users deploy containers, users specify the priority of the container. Containers with higher priority are given higher priority to execute from the container orchestrator 104. If the computing resource is insufficient to execute all containers, containers with low priority can be stopped instead.

In example implementations, the storage driver 105 in the first data center (DC1) can retrieve storage pool capacity information of storage systems 102 in the second data center (DC2), as well as volume and container information from the second data center. Based on the retrieved information and the same type of information managed by the first data center, the storage driver 105 determines which volume to be replicated or to be unreplicated based on the priority of the container. Based on the determination, the storage drivers 105 configure replications or cancel replications.

In FIG. 1, the deployment of a container is shown as an example of a trigger to execute the method of the present disclosure. However, the present disclosure is not limited to such a trigger. For an example, the disclosed method can be executed when the priority of the container is changed. Furthermore, for another example, the disclosed method can be executed periodically in the background, independent of deployment of a container or a change of priority.

Figure 2:
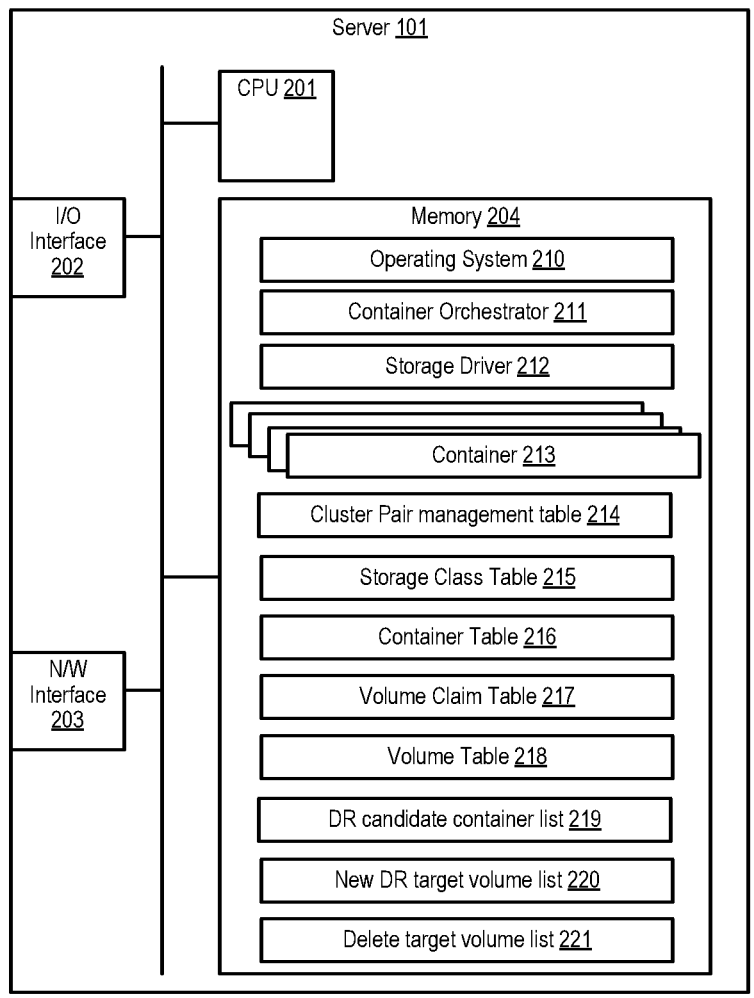
FIG. 2 illustrates an example of hardware configuration of the server, in accordance with an example implementation.

FIG. 2 illustrates an example of hardware configuration of the server 101, in accordance with an example implementation. To reduce memory consumption, data in the tables can be stored in non-volatile media and cache at least in part in memory. Server 101 can involve central processing unit (CPU) 201, Input/Output (I/O) interface, Network (NW) interface 203, and memory 204. Memory 204 may manage various programs and tables, such as Operating System 210, Container Orchestrator 211, Storage Driver 212, Container 213, Cluster Pair management table 214, Storage Class Table 215, Container Table 216, Volume Claim Table 217, Volume Table 218, DR candidate container list 219, New DR target volume list 220, and Delete target volume list 221. Further details of these tables and elements are provided below.

Figure 3:
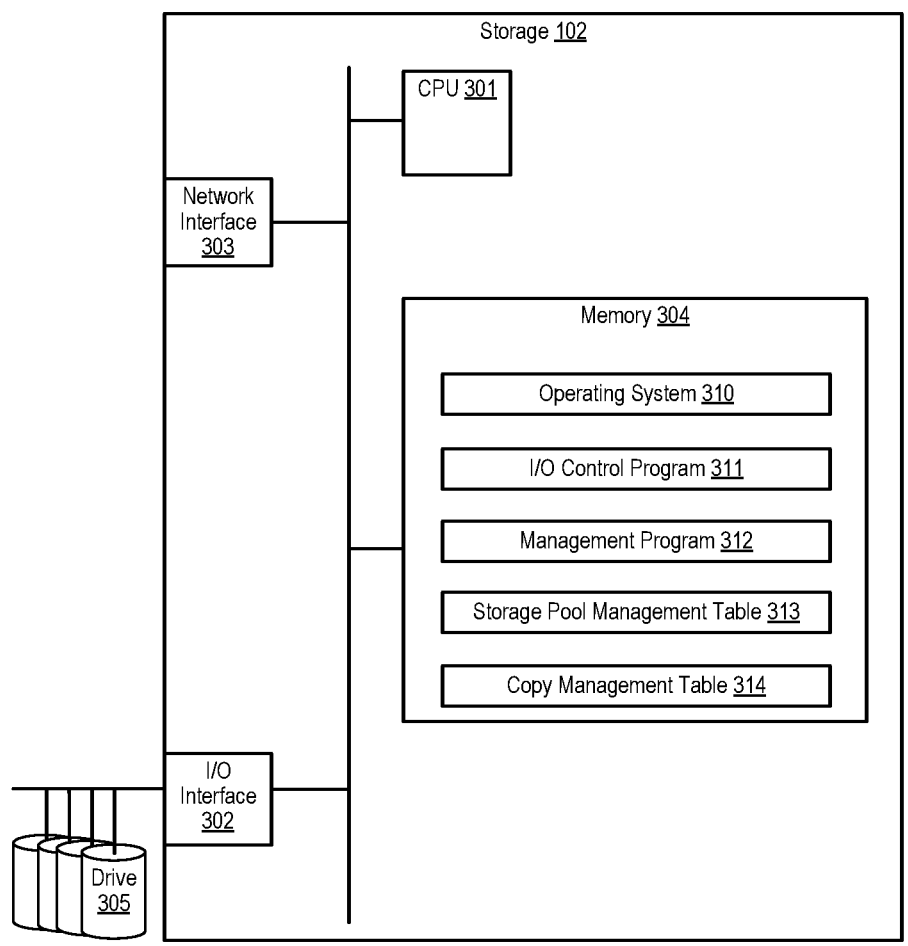
FIG. 3 illustrates an example of a hardware configuration of the storage system, in accordance with an example implementation.

FIG. 3 illustrates an example of a hardware configuration of storage system 102, in accordance with an example implementation. To reduce memory consumption, the data in the tables can be stored in non-volatile media and cached partially in memory, or otherwise, in accordance with the desired implementation. Some programs and table can be stored into memory, wherein programs are loaded to CPU so that the CPU can execute the programs. As storage, dedicated hardware or a general-purpose server can be used with software defined storage technology.

Storage system 102 can involve CPU 301, I/O Interface 302, Memory 304, and Network Interface 303 configured to interact with storage drives 305. Memory 304 can manage an Operating System 310, I/O Control Program 311, Management Program 312, Storage Pool Management Table 313, and Copy Management Table 314. Further details of these programs and tables and programs are provided below.

FIG. 4 illustrates an example of a cluster pair management table, in accordance with an example implementation. Each entry of this table indicates pairs of clusters that are the DR source and destination. Each entry is defined by the users. Based on this table, a storage driver thereby can determine which clusters to contact. As illustrated in FIG. 4, the name field is an identifier of an entry. Cluster1 and Cluster2 fields are identifiers of clusters which compose the pair. Examples of the identifier are the uniform resource locator (URL) of the cluster, hostname or internet protocol (IP) address of servers, and so on in accordance with the desired implementation.

FIG. 5 illustrates an example of a storage class table, in accordance with an example implementation. Each entry represents a storage pool which users can use through container orchestrator. Each entry is defined by users. The name field is an entry identifier. The storage identifier (ID) indicates the identifier of a corresponding storage. Examples of a storage identifier can include the serial number, IP address and URL of the underlying storage system. The Pool ID field is an identifier of the pool in the storage system indicated by the storage ID. The address field is an address to request, create, delete, modify and obtain the storage configuration. Examples of the address field can include the URL or the IP address. A storage driver sends requests to this address when a storage driver creates and deletes volumes, establishes and cancels copies, and/or obtains the configuration and status information. If the storage ID and the address are the same, or if one field can be derived from another field, then such fields can be omitted in accordance with the desired implementation. In another example, if the underlying storage systems only have a single storage pool, then either field can be omitted.

FIG. 6 illustrates an example of a container table, in accordance with an example implementation. This table maintains information for the container running on the container orchestrator. Each entry is defined by a user when users deploy the container to a container orchestrator. The name field is an identifier of a container. The image URL field indicates information regarding where to fetch the container image when launching the container. The volume claim field is a pointer to an entry in a volume claim table. If the container uses multiple volumes, then the entry can have multiple pointers. The priority field indicates the priority of the container execution. When resources are insufficient, the container orchestrator will give priority to the container which has higher priority. Expressing the priority as a number is one possible form, and any form that expresses a relative relationship can be utilized in accordance with the desired implementation. In addition, expressing the priority through a single value for a single container is also possible. It is also possible to define the priority for each container with multiple values to indicate the priority allocations for each underlying resource type such as CPU or memory.

FIG. 7 illustrates an example of a volume claim table, in accordance with an example implementation. A volume claim is a request issued by users in order to prepare volumes for a container. A container orchestrator manages volume claims with this table. As one of the manifests of the application, the users define this information and deploy to the container orchestrator. The relation between a container and a volume claim is maintained by pointing an entry of the volume claim table from the container table. The relation between a volume and a volume claim is maintained by pointing an entry of the volume claim table from volume table. In addition, a storage driver refers to this table to obtain claim information. Each entry has a name, size, and storage class name. The name is an identifier of the volume claim. The size is the requested size of a volume. The storage class name is a name of the storage class from which the volume is created.

FIG. 8 illustrates an example of a volume table, in accordance with an example implementation. A container orchestrator maintains information for the volumes as created by a storage driver. Each entry has a name, claim reference (ref.), size, storage class name, and volume ID. The name is an identifier of an entry. Volume claim ref. is a pointer to an entry of a volume claim table. This volume is created in response to the request which is described by the volume claim. Size is the size of the volume. Storage class name is a pointer to the storage class from which the volume was created. Volume ID is a volume identifier as assigned by the storage.

FIG. 9 illustrates an example of the DR candidate container list, in accordance with an example implementation. This table is created by processing described in FIG. 15 and maintained temporarily during this processing. The container name is an identifier of the container. The container priority indicates the priority of the container execution. Each entry of the DR candidate container list has one or more entries of volumes indicating the volumes of the container.

Volume field is divided into "in own cluster" field and "in paired cluster" field. "in own cluster" field has volume name, claim name, size, and replicated field. Volume name is an identifier of the volume. Claim name is an identifier of the volume claim which is pointed from the volume specified by volume name field. This information can be omitted because the storage driver can find the claim name from volume table. Size indicates volume size. Replicated involves information which indicates whether the volume has already been replicated or not.

"in paired cluster" field maintains the pair volume of the copy relation of the volume indicated by "in own cluster" field. If the copy relation is not established, this field is filled with blank values or other values indicative of blank/null. This field can include volume name, claim name, and size. Volume Name is an identifier of volume. Claim name is an identifier of volume claim which is pointed from volume specified by volume name in volume table. This information can be omitted because the storage driver can find the claim name from volume table. Size indicates volume size.

FIG. 10 illustrates an example of the new DR target volume list, in accordance with an example implementation. This table is created from processing described in FIG. 15 and subroutine processing as described in FIG. 13. Further, this table is temporary maintained during processing as described in FIGS. 13, 14, and 15. Volume Name is an identifier of volume. Claim name is an identifier of the volume claim which is in its own cluster. Either volume name or claim name can be omitted. Size indicates volume size.

FIG. 11 illustrates an example of a delete target volume list, in accordance with an example implementation. This table is created processing which is described in FIG. 16 and subroutine of processing described in FIG. 14. Further, these tables are temporarily maintained during processing as described in FIGS. 14-16.

The volume name in own cluster is an identifier of the volume that is the copy source in the first cluster. The claim name in own cluster is an identifier of the volume claim that is copy source in the first cluster. Volume name in paired cluster is an identifier of the volume which is the copy destination in the second cluster. Claim name in paired cluster is an identifier of the volume claim which is the copy destination in the second cluster.

FIG. 12 illustrates an example of storage pool management table, in accordance with an example implementation. This table is maintained by a storage to maintain storage pool information. Storage drivers can cache all or part of this table for processing efficiency. Pool ID is an identifier of a storage pool in each storage. Total Capacity indicates the capacity of the storage pool. Used Capacity indicates the used capacity of the total capacity.

FIG. 13 illustrates an example of copy management table, in accordance with an example implementation. This table is maintained by a storage to maintain copy relation between volumes. A storage system inserts a new entry to this table when the storage system configures a copy in response to a request from storage drivers.

Each entry has source volume ID, source storage ID, destination volume ID, destination storage ID and status. Source volume ID is an identifier of a volume that is the copy source. Source storage ID is an identifier of the storage system that owns the source volume. Destination volume ID is an identifier of a volume that is the copy destination. Destination storage ID is an identifier of a storage which owns the destination volume. Status is the copy status. This field indicates that the copy is ongoing, completed or suspended.

Figure 14:
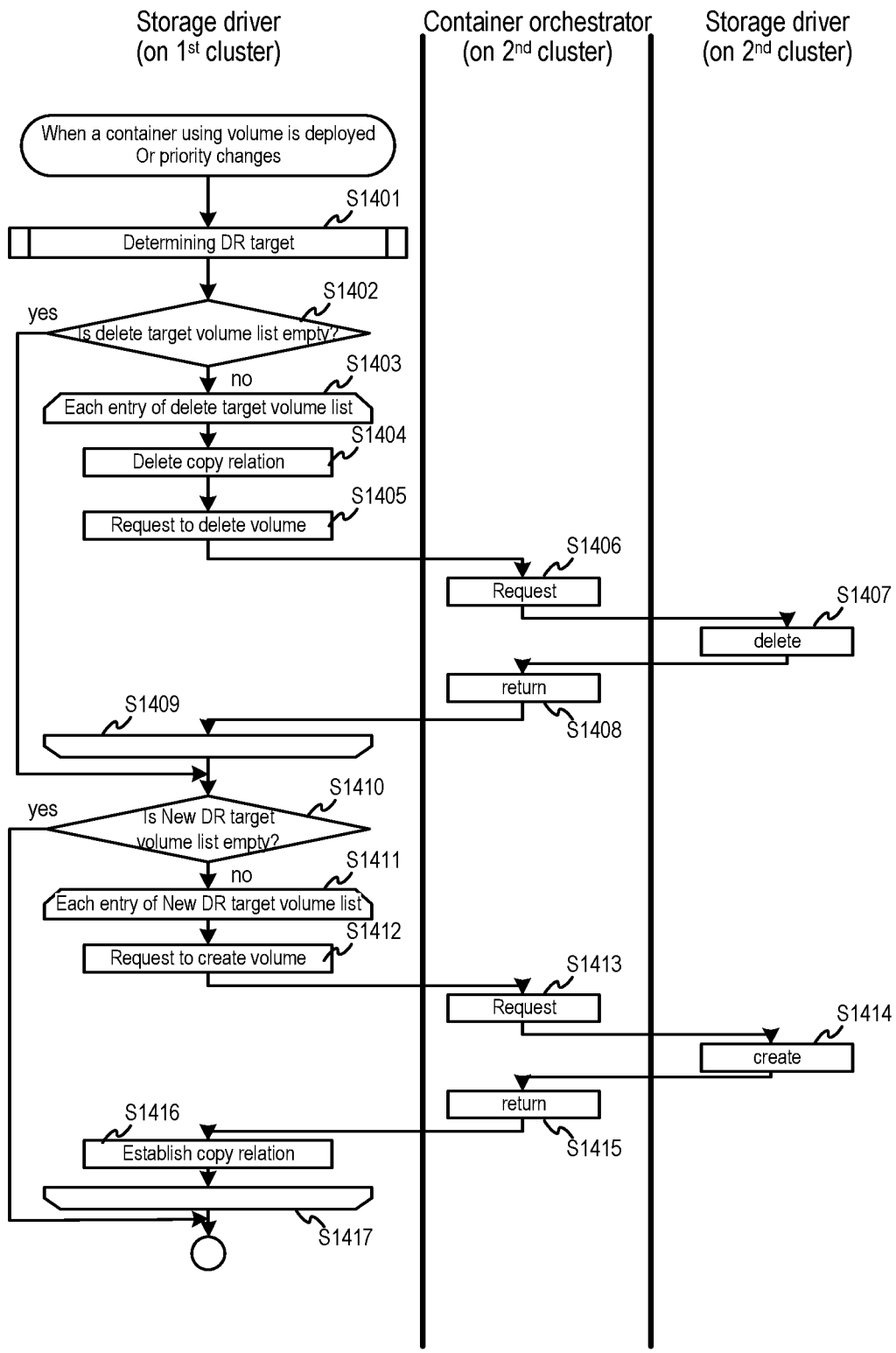
FIG. 14 illustrates an example of the processing flow for establishing and canceling volume replication based on the priority of containers that use volumes, in accordance with an example implementation.

FIG. 14 illustrates an example of the processing flow for establishing and canceling volume replication based on the priority of containers that use volumes, in accordance with an example implementation. This processing is processed by a storage driver on the servers when containers using volume is deployed or priority of container is changed by users.

When a container is deployed, the volume used by the container has not yet been created, and it may be necessary to create it newly in the first storage. In this case, the processing illustrated in FIG. 14 is executed after the volume is created on the first storage. If not so, the processing illustrated in FIG. 14 is executed without creating new volumes. When the volumes used by the container already exists when the container is deployed, when the priority of container is changed, and when disclosed method is executed in the background, the processing shown in FIG. 14 is executed without creating the volume and establish or cancel replication of existing volumes.

First, a storage driver determines the DR target (S1401). An example of this processing is provided in FIG. 15. This processing returns a delete target volume list and a new DR target volume list. If the delete target volume list is empty (S1402 is yes), then the storage driver skips S1403 to S1409 and proceeds to S1410. If not (S1402 is no), the storage driver executes the processing from S1404 to S1408 for each entry of the delete target volume list (loop from S1403 and S1409). The storage drivers deletes the copy relation between volumes which is indicated by the volume name in the entry of the delete target volume list (S1404). To delete the copy relation, the storage driver gets a copy management table entry from a storage system with the specified volume ID. The volume ID is a volume ID field of the volume table entry whose name is the same as the volume name within its own cluster field of the entry. After S1404, the storage driver requests the container orchestrator on the second cluster to delete the volume indicated by "volume name in paired cluster" and "claim name in paired cluster" (S1405). In response to the request, the container orchestrator requests the storage driver on the second cluster to delete the volume (S1406). Then, the storage driver requests a storage system to delete the volume (S1407). In addition, the storage driver deletes the entry of the volume from the volume table in the second cluster. Then, the container orchestrator deletes the entry of the volume from a volume claim table in the second cluster and returns the result (S1408).

Next, if the new DR target volume list is empty (S1410 is yes), then the storage driver finishes this processing. If not (S1410 is no), the storage driver executes the process from S1412 to S1416 for each entry of new DR target volume list (loop from S1411 and S1417). The storage driver requests the container orchestrator on the second cluster to create a volume to be copy destination. To request it, the storage driver can send the volume claim specified by the claim name of the entry of the new DR target volume list to the container orchestrator on the second cluster (S1412). In response to the request, the container orchestrator inserts the claim to the volume claim table in the second cluster and requests the storage driver on the second cluster to create the volume (S1414). Based on the request, the storage driver requests a storage system to create the volume (S1414). The storage system then creates the volume. After creating the volume, the storage driver inserts a new entry to the volume table in the second cluster. After that, the container orchestrator returns the information of the volume (S1415). Finally, the storage driver on the first cluster establishes a copy between the created volume and volume indicated by the entry of new DR target volume (S1416).

Figure 15:
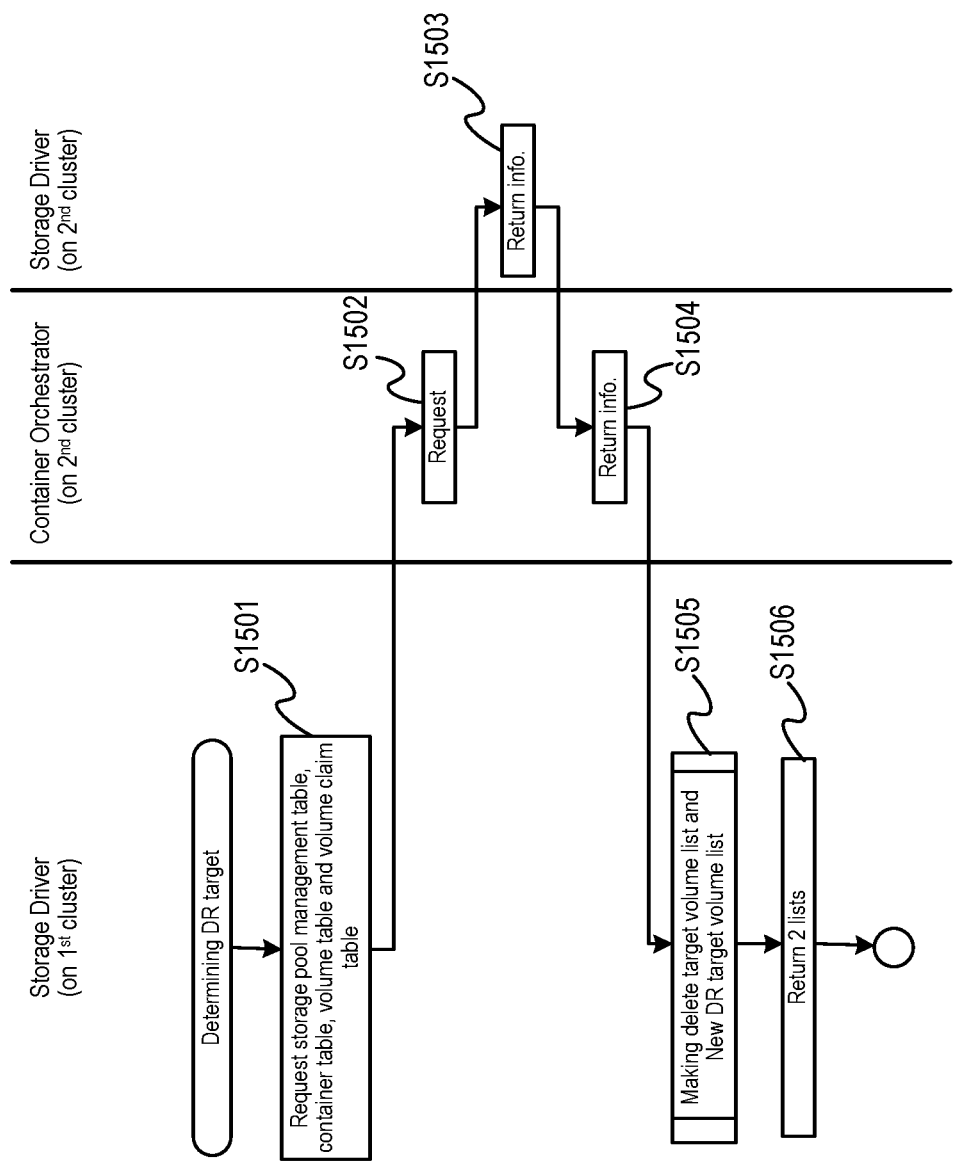
FIG. 15 illustrates an example of processing flow for determining the DR target based on the container priority, in accordance with an example implementation.

FIG. 15 illustrates an example of processing flow for determining the DR target based on the container priority, in accordance with an example implementation. This processing is a subroutine of FIG. 14 and executed by the storage driver on the first cluster. This processing makes a delete target volume list and a new DR target volume list.

First, the storage driver on the first cluster requests a storage pool management table, a container table, a volume table and a volume claim table from the container orchestrator on the second cluster (S1501). The container orchestrator requests the storage pool management table from the storage driver on the second cluster (S1502). In response to the request, the storage driver requests the table from the storage systems and return the retrieved table to the container orchestrator (S1503). The container orchestrator returns the container table, the volume table and the volume claim table managed by itself in addition to the obtained storage pool management table (S1504).

Next, the storage driver generates the delete target volume list and the new DR target volume list (S1505) and returns the list to the processing described in FIG. 14 (S1506). The processing flow of S1505 is described in FIG. 16.

Figure 16:
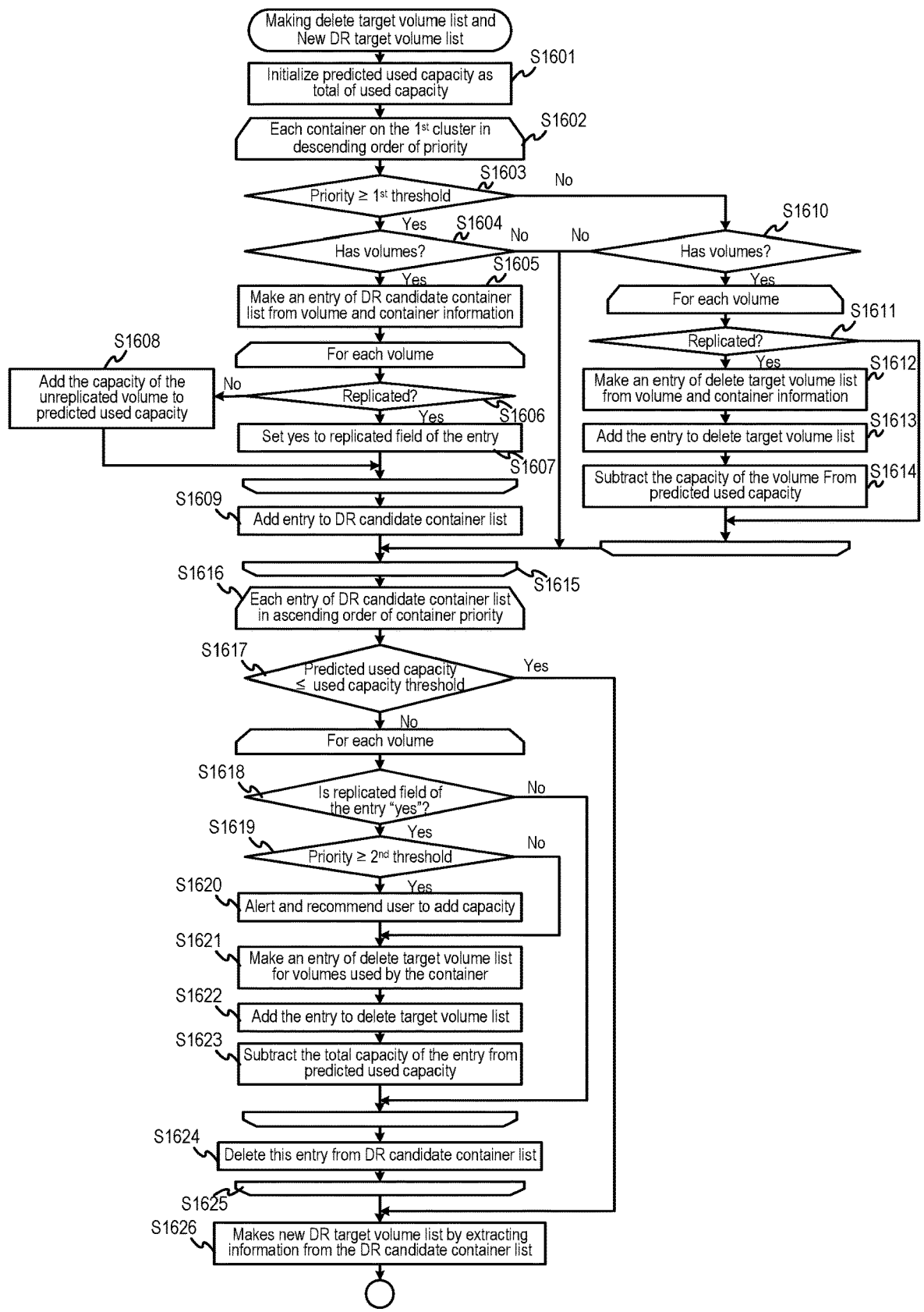
FIG. 16 illustrates an example of processing flow for making a delete target volume list and a new DR target volume list based on container priority, in accordance with an example implementation.

FIG. 16 illustrates an example of processing flow for making a delete target volume list and a new DR target volume list based on container priority, in accordance with an example implementation. This processing is a subroutine of FIG. 15.

Steps from S1601 to S1615 is a determination of DR candidate without considering capacity limitation. Steps from S1616 to S1626 is a determination of DR target volumes from the DR candidate while considering capacity limitations.

First, the storage driver initializes a predicted used capacity as current used capacity of each pool (S1601). The information was obtained in the processing of FIG. 15. Then, if there are multiple storage pools in the second cluster, the storage driver can have multiple predicted used capacity for each storage pool.

The storage driver executes process from S1602 to S1615 for each container on the first cluster in descending order of containers' priority (loop from S1602 and S1615).

If the priority of the container is equal to or higher than the first threshold (S1603 is yes), the storage driver proceeds to S1604. The first threshold indicates that the lowest priority of containers to be the DR target. The first threshold can be specified by users. This threshold can be omitted. In this case, all containers can be DR targets.

If the container does not have volumes (S1604 is no), the storage driver skips this container. If not (S1604 is yes), the storage drivers make an entry of the DR candidate container list based on the entry of the container in container table, the volume claim table and volume table and same kind of table which are retrieved from the second cluster (S1605). The storage driver finds the entries from these tables which have relations with the container and makes an entry for the DR candidate container list. After that, the storage driver executes the process from S1606 to S1608 for each volume used by the container. If the volume has been already replicated (S1606 is yes), the storage driver sets "yes" to the replicated field of the created entry of DR candidate container list (S1607). If not (S1606 is no), the storage drivers add the capacity of the volume to the predicted total capacity (S1608). By this processing, the storage driver predicts the increase of used capacity of the storage pool when the volume is replicated. The entry is then added to the DR candidate container list (S1609).

If the priority of the container is less than the first threshold (S1603 is no), the storage driver proceeds to S1610. If the container does not have volumes (S1610 is no), the storage driver skips this container. If not (S1610 is yes), the storage driver executes the steps from S1611 to S1614 for each volume used by the container.

If the volume is replicated (S1611 is yes), the storage driver proceeds to S1612. The storage driver makes an entry of the delete target volume list from its entry in the volume claim table, the volume table entry, and the volume claim table entry of the copy destination table (S1612). The storage driver adds the entry to the delete target volume list (S1613). Then, the storage driver subtracts the capacity of the volume from predicted used capacity (S1614). By this calculation, the storage driver predicts the decrease of used capacity of the pool when replication of the volume is canceled.

If the volume is no replicated (S1611 is no), the storage driver skips this volume in order to avoid deleting the unreplicated volume.

Further, the storage driver executes steps from S1616 to S1625 for each entry of DR candidate container list in ascending order of container priority (loop from S1616 and S1625). There can be multiple containers having same priority. The example implementation to determine processing order among containers having same priority is provided as follows.

In one example implementation, the storage driver prioritizes the container having a larger total capacity of volumes which have already replicated. By this method, it is possible to reduce wasted data which has been already replicated to the destination cluster. Such an example implementation involves processing the container having a larger total capacity of replicated volumes later than the container having a smaller total capacity of replicated volumes among containers having the same priority at S1616.

In another example implementation, the storage driver prioritizes containers having a smaller total capacity of volumes which have already replicated. By this method, it is possible to reduce the number of containers for which the DR configuration is canceled. Such an example implementation involves processing the container having a smaller total capacity of replicated volumes later than the container having a larger total capacity of replicated volumes among containers having the same priority at S1616.

In another example implementation, the storage driver prioritizes the container having less total volume capacity. By this method, it is possible to configure DR for more containers. Such an example implementation involves processing the container having less total capacity of volumes later than the container having larger total capacity of volumes among containers having same priority at S1616.

If the predicted used capacity is equal to or less than the used capacity threshold (S1617 is yes), the storage driver proceeds to S1626. This threshold is commonly set in order to warn when the unused capacity is low. Since this threshold is used for avoiding capacity depletion, the used capacity should not exceed this threshold. Therefore, the storage driver tries to avoid exceeding this threshold. If the projected used capacity exceeds this threshold, the storage driver determine that volumes of low priority containers should not be replicated. The storage driver tries to increase free capacity by deleting volumes from storage in the second cluster. Then, if unreplicated volumes in the second cluster are deleted, data will be lost. Therefore, the storage driver determines the deletable volumes from volumes which are the copy destination volume of volumes used by containers in the first cluster. If predicted used capacity is larger than the used capacity threshold (S1617 is no), the storage driver process steps from S1618 to S1623 for each volume used by the container.

If the replicated field is not yes (S1618 is no), the storage driver skips the steps from S1619 to S1623. If the replicated field of the volume is yes (S1618 is yes), the storage driver proceeds to S1619. If the priority of the container is equal to or higher than the second threshold (S1619 is yes), the storage driver alert that DR is not configured against containers which have high priority due to insufficient capacity (S1620). If not (S1619 is not), the storage driver skips S1620. Next, the storage driver makes an entry of delete target volume list for the volume (S1621). The storage driver adds the entry to the delete target volume list (S1622). In addition, the storage driver subtracts the capacity of the volume from the predicted used capacity (S1623). By this calculation, the storage driver predicts the decrease of used capacity of the storage pool when replication of the volume is canceled.

After processing from S1618 to S1623 for all volumes of the container, the storage driver deletes the processing entry from the DR candidate container list (S1624).

Finally, the storage driver makes a new DR target volume list by extracting entries for which "replicated" field of DR candidate container list indicates that the volume has not replicated yet (S1626).

Figure 17:
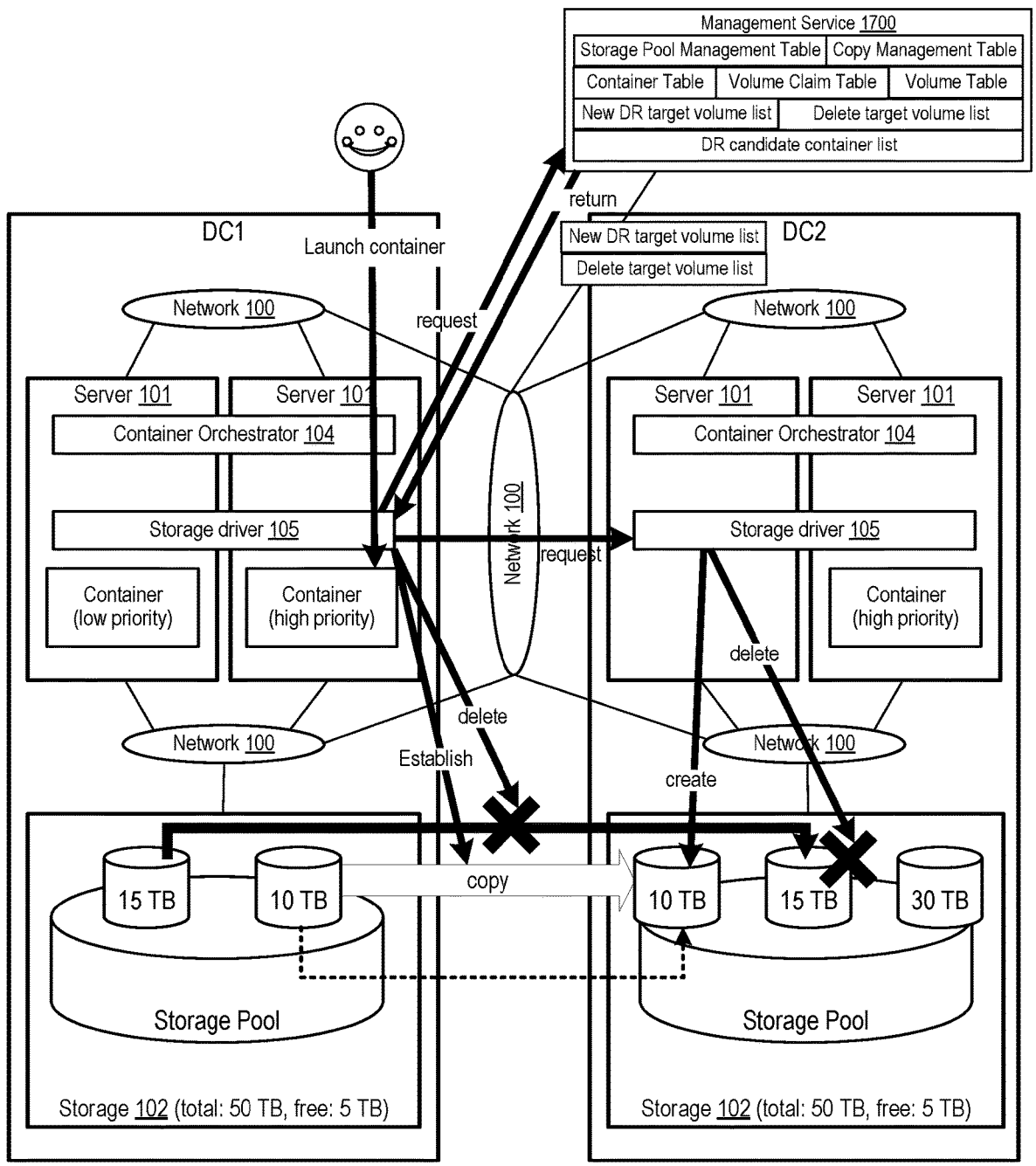
FIG. 17 illustrates an example of an overall system configuration and a processing flow of the second example implementation.

FIG. 17 illustrates an example of an overall system configuration and a processing flow of the second example implementation. In the second embodiment, the processing described in FIG. 15 and FIG. 16 is processed by a remotely connected management service 1700. For example, this service is provided as a Software as a Service (SaaS) management tool operating outside of the clusters. This service 1700 collects configuration information from clusters and storages in each data center to monitor system. Examples of the configuration information can include the storage pool management tables and copy management tables which are retrieved from each storage and container tables, volume claim tables and volume tables retrieved from each cluster. Based on the information maintained by the service, management service executes the processing described in FIG. 15 and FIG. 16, when the storage driver on the first cluster requests the management service 1700 to make the new DR target volume list and the delete target volume list. If management service maintains all tables, management service can skip the steps from S1501 to S1504. This makes communication traffic between the management service and clusters smaller.

The example implementations described herein can be utilized for IT infrastructure for digital service businesses operated in a DevOps manner. Through such example implementations, users can easily configure disaster recovery for as many applications permitted by the resources in order of importance of the applications without special settings or frequent operations. If new applications are frequently deployed, or application requirements are frequently changed, users are not required to reconfigure the system. Thus, users can achieve resource utilization efficiency, availability and ease of use.

When a problem occurs in the first storage or the first cluster, it is possible to continue the operation of the application that had been running as a container by running the container on the second cluster using the volumes replicated from the first storage to the second storage. There are three ways to operate the container in the second cluster.

The first is the hot standby configuration. In this configuration, the standby containers are launched on the second cluster before the problem occurs on the first cluster or the first storage, but the containers on the second cluster are left in standby state without executing any process. To setup this configuration, when the storage driver establishes replication of the volumes of the containers, the storage driver requests the container orchestrator on the second cluster to launch the containers on the second cluster in standby mode. In addition, when the storage driver cancels replication of the volumes and deletes the replication destination volumes, the storage driver requests the container orchestrator on the second cluster to stop and delete the containers which use the deleted volumes. These processing can be done by users manually. After the storage driver establishes or cancels the replication, users manually deploy or delete the containers on the second cluster in standby mode. The standby container on the second cluster is activated when a failover is initiated after the problem occurs. In addition, the first container on the first cluster uses the volumes in the first storage, and the second container on the second cluster uses the volumes which are replicated from the first storage to the second storage. When there is a problem with the first cluster or the first storage, the second container on the second cluster is activated and resumes operations with using the replicated volumes. This method can be configured without requiring any special capabilities in the application and can recover in a shorter time than the cold standby configuration described below. However, the second container requires IT resource to maintain.

The second is the cold standby configuration. In this configuration, standby containers are not launched on the second cluster before a problem occurs. The standby containers are deployed and launched when a failover is initiated after the problem occurs. In addition, the first container on the first cluster uses the volumes in the first storage, and the second container on the second cluster uses the volumes which are replicated from volumes on the first storage to the second storage. Similar to the hot standby configuration, this configuration does not require any special capabilities for the application. In addition, the cost for the cold standby is smaller than the hot standby because the cold standby does not require any resources to maintain the containers on the second cluster before failover.

The third is the active-active configuration. In this configuration, containers are launched on the second cluster and perform processing before a problem occurs on the first cluster or the first storage. To setup this configuration, when storage driver establishes the replication of the volumes of the containers, the storage driver requests the container orchestrator on the second cluster to launch the containers on the second cluster. In addition, when the storage driver cancels the replication of the volumes and deletes the replication destination volumes, storage driver requests the container orchestrator on the second cluster to stop and delete the containers which use the deleted volumes. These processing can be done by users manually. After the storage driver establishes or cancels the replication, users manually deploy or delete the containers on the second cluster. In order to have this configuration, the application which runs as the container must have the capability to perform processing while sharing data among multiple containers. Further, both containers on the both clusters access volumes in the first storage before failover in this configuration. After failover, both containers on the both clusters access volumes in the second storage. To implement this, path from containers to the volumes in the first storage and path from containers to the volumes in the second storage are established with multipath tool.

To avoid the split-brain situation, only one of the containers on the first cluster and the container on the second cluster should have access to the volumes in hot standby and cold standby configuration. This is because if the both containers writes data to the volumes, data consistency may be collapsed. Further, in the an active-active configuration, only one of the volumes in the first storage and the second storage need to be accessed by the containers. This is because if both containers write data to different volume, data consistency may be collapsed. To prevent these problems, it is necessary to limit the access destination to one side, such as using the volume of the first storage before the failover and using the volume of the second storage after the failover.

To achieve this, users can conduct manual operation. For the hot standby configuration, users can manually stop or inactivate the first container on the first cluster first and activate the second container on the second cluster. For cold standby configuration, users can manually stop the first container on the first cluster first and launch the second container on the second cluster. In both cases, the first container uses only volumes in the first storage and the second container use only volumes in the second storage. For active-active configuration, users manually switch volume to be used for both containers on the first cluster and the second cluster.

However, this method does not always work well to prevent the split-brain situation because it may not be possible to manually stop or inactivate the first container on the first cluster or switch access destination of the first container at failover.

If the storages are replicating data while monitoring the health status of each storage by using quorum and heartbeat communication with technology disclosed by U.S. Ser. No. 10/114,691B2, U.S. Pat. No. 9,794,342B2 and U.S. Pat. No. 8,645,649B2, the split-brain situation can be prevented more reliably and automatically with technology disclosed in U.S. Ser. No. 11/106,371.

In the hot standby configuration, when users activate standby containers running on the second cluster, the storage driver deletes access paths between the first container and the volume in the first storage and access path between the first storage and quorum with the procedure disclosed in U.S. Ser. No. 11/106,371. By this processing, the second container on the second cluster becomes accessible to the volume in the second storage, while the first container on the first cluster becomes inaccessible to the volume in the first storage. As a result, even if the first container is running, it can stop processing and prevent the split-brain situation.

In the cold standby configuration, when users launch containers onto the second cluster, the storage driver delete access paths between the first container and the volume in the first storage and the access path between the first storage and quorum with the procedure disclosed in U.S. Ser. No. 11/106,371. By this processing, the second container on the second cluster becomes accessible to the volume in the second storage, while the first container on the first cluster become inaccessible to the volume in the first storage. As a result, even if the first container is running, it can stop processing and prevent split brain.

In active-active configuration, when users request the storage driver to switch volume to be used, storage driver delete access paths between the first container and the volume in the first storage and access path between the first storage and quorum with the procedure disclosed in U.S. Ser. No. 11/106,371. By this processing, the second container on the second cluster becomes accessible to the volume in the second storage, while the first container on the first cluster become inaccessible to the volume in the first storage. As a result, even if the first container is running, the first container becomes to access the volume in the second storage.

In a first aspect, there is a method which can involve creating a volume in a first storage system for each of one or more containers newly launched on one or more servers managing a container orchestrator; and establishing replication of the volume for the each of the newly launched one or more containers to a second storage system in order from highest container priority to lowest container priority as illustrated in FIGS. 1 and 14 to 17.

In a second aspect, there is a method as that of the first aspect, wherein for insufficient capacity existing in the second storage system for the replication of the volume for the each of the newly launched one or more containers, canceling the replication of the one or more containers from the lowest container priority as illustrated in FIGS. 12, and 15 to 17.

In a third aspect, there is a method as that of any of the above aspects, further comprising, for ones of the one or more containers having a same priority, for sufficient capacity existing in the second storage system, replicate the ones of the one or more containers with the same priority to the second storage system as illustrated in FIGS. 15 to 17.

In a fourth aspect, there is a method as that of any of the above aspect, further comprising, for insufficient capacity existing in the second storage system, prioritizing ones of the one or more containers with the same priority having larger total capacity of volumes that have already been replicated to the second storage system as illustrated in FIGS. 16 and 17.

In a fifth aspect, there is a method as that of any of the first through third aspects, further comprising, for insufficient capacity existing in the second storage system, prioritizing ones of the one or more containers with the same priority having smaller total capacity of volumes that have already been replicated to the second storage system as illustrated in FIGS. 16 and 17.

In a sixth aspect, there is a method as that of any of the first through third aspects, further comprising, for insufficient capacity existing in the second storage system, prioritizing ones of the one or more containers with the same priority having smaller total capacity as illustrated in FIGS. 16 and 17.

In a seventh aspect, there is a method as that of any of the above aspects, further comprising, for capacity of the second storage system is reached before all volumes of the newly one or more launched containers are replicated to the second storage system, determining one or more replicated volumes in the second storage system associated with previously launched containers having a lower priority than the remaining newly launched one or more containers; and deleting one or more of the one or more replicated volumes associated with previously launched containers having the lower priority than the remaining newly launched on or more containers in the second storage system as illustrated in FIGS. 1 and 14 to 17.

In an eight aspect, there is a method as that of any of the above aspects, further comprising, for a change in priority to one or more containers currently launched on the one or more host computers, determining whether replication is needed for the one or more containers with the changed priority; for a determination that replication is needed and that sufficient capacity exists in the second storage system, replicating the one or more containers with the changed priority to the second storage system; for the determination that replications is needed and that the second storage system has insufficient capacity, determining volumes in the second storage system associated with containers having a lower priority than the one or more containers with the changed priority, and deleting the determined volumes associated with containers having the lower priority as illustrated in FIGS. 1 and 14 to 17.

In a ninth aspect, there is a method as that of any of the above aspects, wherein the establishing replication of the volume for the each of the newly launched one or more containers to a second storage system in order from the highest container priority to the lowest container priority comprises only replicating volumes for the newly launched one or more containers having a priority beyond a threshold; wherein for a change in priority occurring in previously launched containers, only replicating volumes for ones of the previously launched containers having the change in priority beyond the threshold as illustrated in FIGS. 1 and 14 to 17.

In a tenth aspect, there is a method as that of any of the above aspects, wherein the method is executed by a management apparatus configured to manage the one or more servers, the first storage system, and the second storage system and store management information associated with the volume, the newly launched one or more containers, and storage capacity of the first storage system and the second storage system as illustrated in FIGS. 1 to 3 and 17.

In an eleventh aspect, there is a method as that in any of the first to ninth aspects, wherein the method is executed by the one or more servers as illustrated in FIGS. 1 to 3.

In a twelfth aspect, there is a method as that in any of that of the above aspects, further comprising providing an alert for when the second storage system has insufficient capacity for the replication of the newly launched one or more containers or for a previously launched container having a change in priority over a threshold as illustrated in FIG. 16.

In a thirteenth aspect, there is a method as that in any of the above aspects, where in the method is stored as a computer program having instructions to execute any of the method steps therein through one or more processors. Such a computer program and instructions may be stored in a non-transitory computer readable medium.

In a fourteenth aspect, there is a method as that in any of the first through ninth aspects and twelfth aspect, in which the method is executed by a processor in an apparatus such as a server.

In any of the aspects as described herein, the container may be replaced with a computing unit in accordance with the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
  establishing replication of volume for each of a plurality of computing units on one or more servers managing a computing unit orchestrator to a second storage system in order from highest computing unit priority to lowest computing unit priority; and
  when capacity of the second storage system is reached before all volumes of the plurality of computing units are replicated to the second storage system;
  determining one or more replicated volumes in the second storage system associated with previously launched computing units having a lower priority than remaining computing units of the plurality of computing units that have yet to be replicated; and
  deleting one or more of the one or more replicated volumes in the second storage system associated with previously launched computing units having the lower priority than the remaining computing units of the plurality of computing units that have yet to be replicated.

2. The method of claim 1, wherein for insufficient capacity existing in the second storage system for the replication of volume for the each of the plurality of computing units, canceling the replication of the plurality of computing units from the lowest computing unit priority.

3. The method of claim 1, further comprising, for ones of the plurality of computing units having a same priority:
for sufficient capacity existing in the second storage system, replicate the ones of the plurality of computing units with same priority to the second storage system.

4. The method of claim 3, further comprising:
for insufficient capacity existing in the second storage system, prioritizing ones of the plurality of computing units with the same priority having larger total capacity of volumes that have already been replicated to the second storage system.

5. The method of claim 3, further comprising:
for insufficient capacity existing in the second storage system, prioritizing ones of the plurality of computing units with the same priority having smaller total capacity of volumes that have already been replicated to the second storage system.

6. The method of claim 3, further comprising:
for insufficient capacity existing in the second storage system, prioritizing ones of the plurality of computing units with the same priority having smaller total capacity.

7. The method of claim 1, further comprising, for a change in priority to one or more computing units currently launched on one or more host computers:
determining whether replication is needed for the one or more computing units with the changed priority;
for a determination that replication is needed and that sufficient capacity exists in the second storage system, replicating the one or more computing units with the changed priority to the second storage system;
for the determination that replication is needed and that the second storage system has insufficient capacity, determining volumes in the second storage system associated with computing units having a lower priority than the one or more computing units with the changed priority, and deleting the determined volumes associated with computing units having the lower priority.

8. The method of claim 1, wherein the establishing replication of volume for the each of the plurality of computing units to a second storage system in order from highest computing unit priority to lowest computing unit priority comprises only replicating volumes for the plurality of computing units having a priority beyond a threshold;
wherein for a change in priority occurring in previously launched computing units, only replicating volumes for ones of the previously launched computing units having the change in priority beyond the threshold.

9. The method of claim 1, wherein the method is executed by a management apparatus configured to manage the one or more servers, the first storage system, and the second storage system, and store management information associated with the replicated volume, the plurality of computing units, and storage capacities of the first storage system and the second storage system.

10. The method of claim 1, wherein the method is executed by the one or more servers.

11. The method of claim 1, further comprising:
providing an alert for when the second storage system has insufficient capacity for the replication of volumes of the plurality of computing units having higher priority over a threshold.

12. A non-transitory computer readable medium, storing instructions for executing a process, the instructions comprising:
establishing replication of volume for each of a plurality of computing units to a second storage system in order from highest computing unit priority to lowest computing unit priority; and
when capacity of the second storage system is reached before all volumes of the plurality of computing units are replicated to the second storage system;
determining one or more replicated volumes in the second storage system associated with previously launched computing units having a lower priority than remaining computing units of the plurality of computing units that have yet to be replicated; and
deleting one or more of the one or more replicated volumes in the second storage system associated with previously launched computing units having the lower priority than the remaining computing units of the plurality of computing units that have yet to be replicated.

13. A server, comprising:
a processor, configured to:
establish replication of volume for each of a plurality of computing units to a second storage system in order from highest computing unit priority to lowest computing unit priority; and
when capacity of the second storage system is reached before all volumes of the plurality of computing units are replicated to the second storage system;
determining one or more replicated volumes in the second storage system associated with previously launched computing units having a lower priority than remaining computing units of the plurality of computing units that have yet to be replicated; and
deleting one or more of the one or more replicated volumes in the second storage system associated with previously launched computing units having the lower priority than the remaining computing units of the plurality of computing units that have yet to be replicated.

* * * * *